(12) United States Patent
Gupta et al.

(10) Patent No.: US 9,206,679 B2
(45) Date of Patent: *Dec. 8, 2015

(54) METHOD OF SERVICING A WELLBORE WITH AN AQUEOUS GEL CONTAINING A FRICTION REDUCER

(71) Applicant: Baker Hughes Incorporated, Houston, TX (US)

(72) Inventors: D. V. Satyanarayana Gupta, The Woodlands, TX (US); Justyna Ferraro, Houston, TX (US); Kay Cawiezel, Fulshear, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,655

(22) Filed: Feb. 21, 2014

(65) Prior Publication Data

US 2014/0251624 A1    Sep. 11, 2014

Related U.S. Application Data

(63) Continuation of application No. 12/751,899, filed on Mar. 31, 2010, now Pat. No. 8,669,213.

(51) Int. Cl.
*C09K 8/588* (2006.01)
*E21B 43/26* (2006.01)
*C09K 8/524* (2006.01)
*C09K 8/68* (2006.01)
*C09K 8/60* (2006.01)
*C09K 8/88* (2006.01)

(52) U.S. Cl.
CPC ............. *E21B 43/26* (2013.01); *C09K 8/524* (2013.01); *C09K 8/602* (2013.01); *C09K 8/68* (2013.01); *C09K 8/882* (2013.01); *C09K 2208/28* (2013.01)

(58) Field of Classification Search
USPC ........................................ 507/225; 166/308.3
See application file for complete search history.

(56) References Cited

U.S. PATENT DOCUMENTS

2008/0087432 A1*   4/2008   Wood et al. ............... 166/305.1

* cited by examiner

*Primary Examiner* — Susannah Chung
*Assistant Examiner* — Atnaf Admasu
(74) *Attorney, Agent, or Firm* — Jones & Smith, LLP; John Wilson Jones

(57) ABSTRACT

A well may be serviced with a fluid formulated with components comprising a friction reducer having at least one polymer unit chosen from acrylamide groups, acrylate groups, sulfo groups, and maleic acid groups; and an anionic surfactant, a cationic surfactant and an aqueous base capable of forming a viscoelastic gel.

20 Claims, 14 Drawing Sheets

METHOD OF SERVICING A WELLBORE WITH AN AQUEOUS GEL CONTAINING A FRICTION REDUCER

This application is a continuation application of U.S. patent application Ser. No. 12/751,899, filed on Mar. 31, 2010.

FIELD OF THE DISCLOSURE

The present disclosure relates generally to a well servicing fluid, and more particularly to a servicing fluid that comprises a viscoelastic gel and a friction reducer.

BACKGROUND

Hydraulic fracturing is a common stimulation technique used to enhance production of fluids from subterranean formations in, for example, oil, gas, coal bed methane and geothermal wells. In a typical hydraulic fracturing treatment operation, a viscosified fracturing fluid is pumped at high pressures and high rates into a wellbore penetrating a subterranean formation to initiate and propagate a hydraulic fracture in the formation. Subsequent stages of viscosified fracturing fluid containing particulate matter known as proppant, e.g., graded sand, ceramic particles, bauxite, or resin coated sand, are then typically pumped into the created fracture. The proppant becomes deposited into the fractures, forming a permeable proppant pack. Once the treatment is completed, the fracture closes onto the proppant pack, which maintains the fracture and provides a fluid pathway for hydrocarbons and/or other formation fluids to flow into the wellbore.

The fracturing fluid is usually a water-based fluid containing a gelling agent, e.g., a polymeric material that absorbs water and forms a gel as it undergoes hydration. The gelling agent serves to increase the viscosity of the fracturing fluid. The increased viscosity provides a number of advantages, including, among other things, improving the fracture propagating ability of the fluid and enabling the fracturing fluid to suspend and carry effective amounts of proppant.

The use of slick water fracturing fluids, which employ a friction reducer, but which generally do not employ a viscosifying agent, is well known in the industry. Most friction reducers used in slickwater fracture stimulation are high molecular weight polyacrylamides in mineral oil emulsions. However, at the concentrations of friction reducer typically employed in slickwater fracturing fluids, which concentrations typically range from about 0.5 gpt to 2 gpt, it is believed that the mineral oil and polyacrylamide in the emulsions can cause a buildup of polymer cake residue that can damage the well formations. For this reason, breakers are sometimes introduced into the slick water fracturing fluids to reduce the size of the polymer chains, and thereby potentially reduce fracture and formation damage.

Aqueous fracturing fluids gelled with viscoelastic surfactants (VESs) are also known in the art. VES-gelled fluids have been widely used as fracturing fluids because they exhibit excellent rheological properties and are less damaging to producing formations than crosslinked polymer fluids. VES fluids are non-cake-building fluids, and thus leave little or no potentially damaging polymer cake residue. However, viscoelastic surfactant gels do not reduce friction at high pump rates, because the micellar structure of the gels is disrupted at high shear rates.

Maintaining a desired viscosity of the gels can have benefits, such as effectively minimizing erosion due to abrasion between the well equipment and the proppant. The erosion or abrasion can result in damage to the pumping equipment and/or well tubulars that are bombarded by the proppant at high flow rates. Further, the ceramic proppant often used in high temperature, high closure wells can be of high density and abrasive, which can exacerbate this problem.

Conventional polyacrylamide emulsion friction reducers can also be difficult to add to cold water fracturing fluids, requiring extended time periods to hydrate in cold water, or the use of additional surfactants and/or heat to hydrate within a desired time frame. Further, conventional polyacrylamide friction reducers often are not generally compatible for use with salt, and therefore may not be suitable for use with hard water, brines or produced water (water that is produced by the well and that generally has high concentrations of total dissolved solids or salts).

Thus, there exists a need for improved well servicing fluids that can reduce or eliminate one or more of the problems discussed above.

SUMMARY

An embodiment of the present disclosure is directed to a well servicing fluid. The well servicing fluid is formulated with components comprising a friction reducer having at least one polymer unit chosen from acrylamide groups, acrylate groups, sulfo groups, and maleic acid groups; and an anionic surfactant, a cationic surfactant and an aqueous base capable of forming a viscoelastic gel.

Another embodiment of the present disclosure is directed to a method of making a preblend composition for adding to a well servicing fluid. The method comprises blending a friction reducer having at least one polymer unit chosen from acrylamide groups, acrylate groups, sulfo groups, and maleic acid groups; an anionic surfactant, a cationic surfactant and an aqueous base. The blending occurs under conditions sufficient to form an aqueous based gel comprising the friction reducer dissolved therein.

Another embodiment of the present disclosure is directed to a preblend. The preblend is formulated with components comprising a friction reducer having at least one polymer unit chosen from acrylamide groups, acrylate groups, sulfo groups, and maleic acid groups; and an anionic surfactant, a cationic surfactant and an aqueous base capable of forming a viscoelastic gel.

Yet another embodiment of the present disclosure is directed to method of servicing a wellbore. The method comprises forming a well servicing fluid by blending a friction reducer having at least one polymer unit chosen from acrylamide groups, acrylate groups, sulfo groups, and maleic acid groups; an anionic surfactant, a cationic surfactant and an aqueous base under conditions sufficient to form an aqueous based gel comprising the friction reducer dissolved therein. The well bore servicing fluid can be introduced into the wellbore.

It has been found that by employing a polyacrylamide friction reducer to the viscoelastic gels of the present application, one or more of the following advantages can be realized: reducing the friction of viscoelastic gels formed with the polyacrylamides of the present application, relative to the friction of the viscoelastic gels alone; reducing the amount of friction reducer in a fracturing fluid compared to known fracturing fluids while still achieving a desired friction reduction; the ability to form preblend solutions; formation of a well servicing fluid that is compatible with brines and produced water, in addition to fresh water; and the ability to maintain a desired viscosity of the well servicing fluid for minimizing erosion or abrasion.

Figure 1:
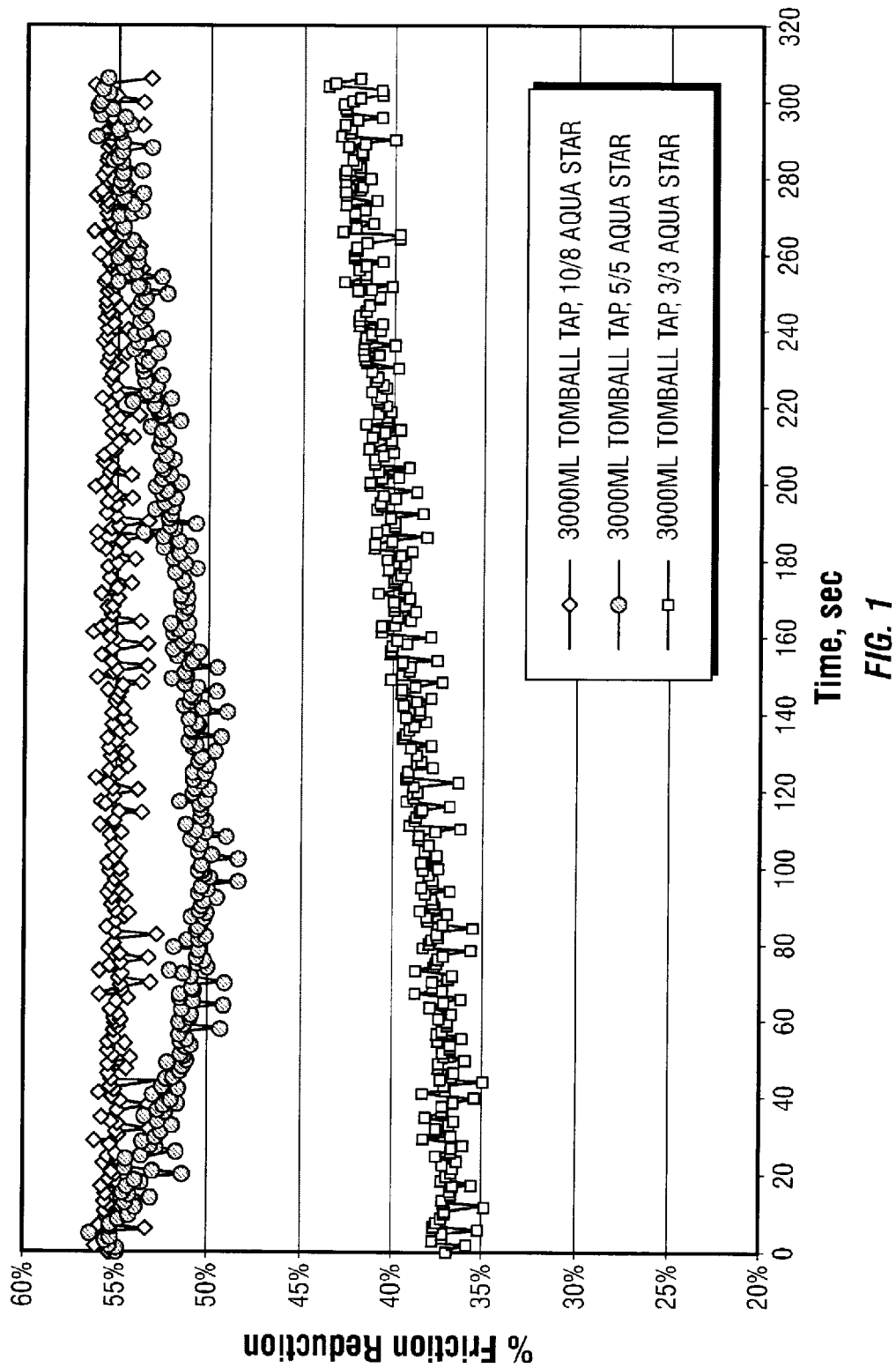
FIGS. 1 to 14 show graphs of data, as described more fully in the Examples set forth in the present application.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a well servicing fluid for use, for example, in natural gas, geothermal, coal bed methane or oil field well bores. The well servicing fluid is formulated with components comprising a polymer friction reducer having at least one polymer unit chosen from acrylamide groups, acrylate groups, sulfo groups, and maleic acid groups; and an anionic surfactant, a cationic surfactant and an aqueous base capable of forming a viscoelastic gel. Optionally, a proppant can be added to the fluid.

Friction Reducer

The friction reducer can be any suitable polymer comprising at least one polymer unit chosen from acrylamide groups, acrylate groups, which can include polymer units derived from acrylic acid or salts or esters thereof, sulfo groups and maleic acid groups. Examples of suitable friction reducers include anionic, cationic and non-ionic polyacrylamides; anionic, cationic and non-ionic polyacrylates; anionic, cationic and non-ionic copolymers of acrylamides and acrylates; anionic, cationic and non-ionic acrylic acid/sulfonic acid copolymers; anionic, cationic and non-ionic maleic acid homopolymers; and anionic, cationic and non-ionic maleic acid/acrylic acid copolymers. One such commercially available friction reducer is known in the art as a partially hydrolyzed polyacrylamide (PHPA) with the tradename ALCOMER® 110RD, which is actually a copolymer of sodium acrylate and acrylamide, and which is available from Ciba Specialty Chemicals Corporation. Another commercially available polymer friction reducer is MAGNAFLOC® 156, which is an anionic polyacrylamide flocculent supplied as a free flowing micro bead, available from Ciba. Still other examples include ZEETAG™ 7888, a cationic polyacrylamide supplied as a liquid dispersion by Ciba; and dispersants sold by SNF Inc. under the FLOSPERSE™ product name, including acrylic acid homopolymers, such as FLOSPERSE™ 9000, 9500, 10000, 15000; acrylamide/acrylic acid copolymers, such as FLOSPERSE™ 4000 C; acrylic acid/sulfonic copolymers, such as FLOSPERSE™ 9000 SL or FLOSPERSE™ 9000 SH; Maleic acid homopolymers, such as FLOSPERSE™ PMA 2A or FLOSPERSE™ PMA 3; Maleic acid/acrylic acid copolymers, such as FLOSPERSE™ 10030 CM; and Acrylic acid/acrylic esters such as FLOSPERSE™ 3040CH.

The friction reducer can be in any suitable form that is capable of dissolution in the aqueous viscoelastic gel, including both dry and liquid forms, such as powders and liquid emulsions. It has been found that dry powders have certain advantages, including easily dissolving with the aqueous gel to form a preblend. Further, the dry powder form can reduce the amount of unwanted ingredients that are introduced into the formation, such as the mineral oil or other carrier oil that is often used in liquid emulsions. In an embodiment, the well servicing fluid does not include a carrier oil, such as mineral oil.

The concentration of friction reducer can be about 0.5 pptg (pounds per thousand gallons) or less, based on the total well servicing fluid. In an embodiment, the concentration of friction reducer can range from about 0.05 pptg to about 0.25 pptg, such as about 0.15 pptg. Ratios and concentrations outside of these ranges can also be employed.

Viscoelastic Gel

The viscoelastic gel can include any suitable aqueous based system formed using an anionic surfactant and a cationic surfactant. Examples of suitable anionic surfactants include xylenesulfonate and salts thereof, such as sodium xylenesulfonate. Examples of suitable cationic surfactants include N,N,N, trimethyl-1-octadecamonium chloride.

A commercially available aqueous based gel system that is suitable for use in the formulations of the present application is AQUA STAR™, which is available from BJ Services Company. The AQUA STAR™ systems are described in detail in U.S. Pat. No. 6,410,489, issued to Kewei Zhang et al., on Jun. 25, 2002, and U.S. Pat. No. 6,468,945, issued to Kewei Zhang, on Oct. 22, 2002, the disclosure of both of which patents are incorporated herein by reference in their entirety.

The viscosity increase of the gel system is due to the association of the cationic and anionic surfactants in water, which forms the viscoelastic gel. Any suitable amounts of anionic surfactant and cationic surfactant that will provide a desired viscosity can be used. The desired viscosity may depend on the application for which the servicing fluid is to be used. If, for example, the servicing fluid is to be employed as a fracturing fluid, the desired viscosity can depend on, among other things, the size and geometry of the fracture to be formed, the ability of the fluid to suspend the proppant in the fluid at a given viscosity and the ability of the fluid to maintain a desired viscosity to reduce damage to pumping equipment at high shear rates.

In an example, the ratio by volume of anionic surfactant to cationic surfactant can range from about 1:4 to about 4:1, or about 5:4 to about 4:5, or about a 1:1 ratio. The concentration of surfactant employed can range from, for example, about 1 to about 100 gallons of cationic surfactant per thousand gallons of total fracturing fluid; and about 1 to about 100 gallons of anionic surfactant per thousand gallons of total fracturing fluid. Further examples include about 3 to about 10 gallons of cationic surfactant and about 3 to about 8 gallons of anionic surfactant per thousand gallons of total fracturing fluid. Ratios and concentrations outside of these ranges can also be employed.

Aqueous Base

Any suitable aqueous base can also be employed. Examples of suitable aqueous base include fresh water, brine, and produced water, and combinations thereof.

The aqueous base fluid can be, for example, water, brine, aqueous-based foams or water-alcohol mixtures. The brine base fluid may be any brine that serves as a suitable media for the various components. As a matter of convenience, in some cases the brine base fluid may be the brine available at the site used in the completion fluid, for example.

In an embodiment where the aqueous fluid is brine, the brines may be prepared using salts including, but not limited to, NaCl, KCl, $CaCl_2$, $MgCl_2$, $NH_4Cl$, $CaBr_2$, $NaBr_2$, sodium formate, potassium formate, and any other stimulation and completion brine salts. The concentration of the salts to prepare the brines can be from about 0.5% by weight of water up to near saturation for a given salt in fresh water, such as 10%, 20%, 30% or more salt by weight of water. The brine may be a combination of one or more of the mentioned salts, such as, for example, a brine prepared using NaCl and CaCl$_2$ or NaCl, CaCl$_2$, and CaBr$_2$.

Proppants and Other Ingredients

Proppants can be mixed with the well servicing fluids of the present application. Any suitable proppant can be employed. Examples of suitable proppant includes graded sand, glass or ceramic beads or particles, sized calcium carbonate and other sized salts, bauxite grains, resin coated sand, walnut shell fragments, aluminum pellets, nylon pellets, and combinations of the above.

Proppants are well known to be used in concentrations ranging from about 0.05 to about 14 pounds per gallon (about 6 to about 1700 kg/m$^3$) of fracturing fluid composition, but higher or lower concentrations can be used as desired for the particular fracture design.

The well servicing fluid can comprise at least one additional compound chosen from breakers capable of reducing the viscosity of the VES fluid, water wetting surfactants, non-emulsifiers, additional viscosifying agents, additional surfactants, clay stabilization additives, scale dissolvers, biopolymer degradation additives, fluid loss control additives, high temperature stabilizers, and other common and/or optional components.

The disclosure of the present application is also directed to a method of making a preblend composition for addition to a well servicing fluid. The method can comprise blending, for example, a friction reducer, an optional proppant, an anionic surfactant, a cationic surfactant and an aqueous base to form an aqueous based gel comprising the friction reducer dissolved therein. Any of the friction reducers, proppants, anionic surfactants, cationic surfactants and aqueous bases discussed above for use in the well servicing fluids of the present application can be employed. For example, a 10 gallon volume of preblend may include 5 gallons each of a commercially available cationic and anionic surfactant, and 0.15 pounds of friction reducer dissolved therein. The aqueous base for the preblend can be limited solely to the aqueous base present in the commercially available cationic and anionic surfactants employed. Alternatively, additional aqueous base can be added to the preblend. The final preblend may be added to, for example, 1000 gallons of the well servicing fluid on the fly.

The friction reducer described above may be added to the preblend mix water (e.g. brine or fresh) either in powder form or in liquid form for continuous mixing or batch mixing operations. The anionic and cationic surfactants may be added at the same time as the friction reducer or may be added before or later in the process.

Any suitable process for adding the proppant and other ingredients to either the preblend or well servicing fluid can be used. For example, after the preblend is added to a fracture fluid mix water, the fracture fluid can be pumped into the well down the tubulars as clean fluid and/or proppant are added to the fracture fluid. Alternatively, some or all of the other ingredients and/or proppant can be added to the preblend simultaneously with the surfactants and/or water-soluble polymer prior to mixing with the fracture fluid mix water to form the finished fracturing fluid.

The present application is also directed to a method of servicing a wellbore. The method comprises forming a well servicing fluid by blending a friction reducer, an optional proppant, an anionic surfactant, a cationic surfactant and an aqueous base under conditions sufficient to form an aqueous based gel comprising the friction reducer dissolved therein, as discussed above. The well servicing fluid can then be introduced into the wellbore.

In one embodiment, the well servicing fluid is introduced as a fracturing fluid into a wellbore. The well servicing fluid can be introduced using any suitable technique. Various techniques for fracturing wells are well known in the art.

In another embodiment, the well servicing fluids of the present application can be used as a cleaning fluid. For instance, the well treatment fluid may be used to clean from a wellbore unwanted particulate matter, such as fills which accumulate in the bottom or bottom portions of oil and gas wellbores. The fill may include proppant, weighting materials, gun debris, accumulated powder, as well as crushed sandstone. The fill might include general formation debris and well rock in addition to cuttings from drilling muds. The well treatment fluids may be used in conjunction with conventional cleaning equipment. More particularly, the well treatment fluids may be used in conjunction with coiled tubing. For instance, the well treatment fluids may be used to clean fill from a wellbore by disturbing particulate solids from running a coiled tubing assembly in-hole while circulating the fluid through a nozzle having a jetting action directed downhole. This may include creating particulate entrainment by pulling out of hole while circulating the well treatment fluid through a nozzle having a jetting action directed uphole. Such mechanisms and coiled tubing systems include those set forth in U.S. Pat. No. 6,982,008, the disclosure of which is herein incorporated by reference in its entirety.

While the viscoelastic fluids are described herein as having use in fracturing fluids and as cleaning fluids, it is expected that the fluids of the present application will find utility in completion fluids, gravel pack fluids, fluid loss pills, lost circulation pills, diverter fluids, foamed fluids, stimulation fluids and the like.

The present application will be further described with respect to the following Examples, which are not meant to limit the invention, but rather to further illustrate the various embodiments.

EXAMPLES

The objective of the following procedure was to determine hydration rate of ALCOMER® 110RD (dry acrylamide/acrylate copolymer friction reducer) and friction reduction of ALCOMER® 110RD in 3/3, 5/5, 10/8 AQUA STAR™ fluids (where the immediately preceding ratios refer to gallons of the cationic compound of the AQUA STAR™ per thousand gallons of total fluid/gallons of the anionic compound per thousand gallons of total fluid).

ALCOMER® 110RD is a multi-functional PHPA drilling fluid additive, which has been specially processed to achieve excellent dispersibility in aqueous based fluids. This special process can allow particles to wet separately and dissolution can proceed rapidly, while reducing or eliminating the formation of lumps or "fish eyes". ALCOMER® 110RD is high molecular weight, anionic, water-soluble, acrylamide-based copolymer. The product is supplied as a free-flowing powder.

Friction reduction of MAGNAFLOC® 156 was also tested. MAGNAFLOC® 156 is a high molecular weight, fully anionic, polyacrylamide flocculent supplied as a free flowing micro bead.

A small-scale friction loop employed in the following procedure was comprised of a small gear pump with a range of 1.5-3.25 gpm; a manual pressure gauge; and 20 ft. of ¼" tube coiled in a circle of 1.5 ft. diameter.

Fluid being tested was drawn from a bucket into the pump via a large ¾" nylon tube. The fluid passed through the pump. Immediately after exiting the pump, the fluid passed through the pressure transducer, which was situated between the pump and the section of tubing. After passing through the ¼" stainless steel tubing, the fluid then entered a short section of ¾" nylon tubing that is submerged in the fluid as it re-entered the bucket. This prevented air entrapment in the fluid. Fluid was recirculated through the coil continuously throughout the test at various flow rates.

0.075 pptg, 0.15 pptg, 0.5 pptg, 1 pptg, and 5 pptg of ALCOMER® 110RD was successively mixed in 500 ml Tomball tap water, in high shear with an Ultra Turrax T25 mixer. Dissolved polymer was added to 2500 ml of tap water in a 5 gallon bucket and mixed for 1 minute using an overhead stirrer. The screening loop program was started and approximately 3/3 AQUA STAR™ fluid was added. The procedure was repeated with different concentrations of ALCOMER® 110RD and the 5/5 and 10/8 AQUA STAR™ fluids described above.

The fluid was circulated through the loop and the differential pressure was recorded every second for 5 to 10 minutes total circulation time. The flow rate was then reduced and the differential pressure recorded at each flow rate. Baseline tests with Tomball tap water, different concentrations of ALCOMER® 110RD and baseline tests with 3/3, 5/5, 10/8 AQUA STAR™ fluids were also performed.

Additional testing was performed with 1 pptg of MAGNAFLOC® 156 in Tomball tap water and 0.15 pptg of MAGNAFLOC® in 5/5 AQUA STAR™ System fluid. Data from this testing are shown in FIGS. 1 to 14.

Example Fluid Formulations:
Fluid Formulation 1
3000 ml Tomball tap water
Fluid Formulation 2
3000 ml Tomball tap water,
3/3 AQUA STAR™
Fluid Formulation 3
3000 ml Tomball tap water,
5/5 AQUA STAR™
Fluid Formulation 4
3000 ml Tomball tap water,
10/8 AQUA STAR™
Fluid Formulation 5
3000 ml Tomball tap water,
0.075 pptg ALCOMER® 110RD
Fluid Formulation 6
3000 ml Tomball tap water,
1 pptg ALCOMER® 110RD
Fluid Formulation 7
3000 ml Tomball tap water,
0.5 pptg ALCOMER® 110RD
Fluid Formulation 8
3000 ml Tomball tap water,
0.5 pptg ALCOMER® 110RD,
5/5 AQUA STAR™
Fluid Formulation 9
3000 ml Tomball tap water,
0.15 pptg ALCOMER® 110RD,
5/5 AQUA STAR™
Fluid Formulation 10
3000 ml Tomball tap water,
0.15 pptg ALCOMER® 110RD
Fluid Formulation 11
3000 ml Tomball tap water,
0.15 pptg ALCOMER® 110RD,
3/3 AQUA STAR™
Fluid Formulation 12
3000 ml Tomball tap water,
0.15 pptg ALCOMER® 110RD,
10/8 AQUA STAR™
Fluid Formulation 13
3000 ml Tomball tap water,
0.5 pptg ALCOMER® 110RD,
3/3 AQUA STAR™
Fluid Formulation 14
3000 ml Tomball tap water,
5 pptg ALCOMER® 110RD
Fluid Formulation 15
3000 ml Tomball tap water,
1 pptg MAGNAFLOC® 156
Fluid Formulation 16
3000 ml Tomball tap water,
0.15 pptg MAGNAFLOC® 156,
5/5 AQUA STAR™

Results and Interpretation:

FIGS. 1-7 show the early time friction reduction of the example fluid formulations. FIG. 1 shows the percent friction reduction for the AQUA STAR™ fluid systems in fresh water. Results show increasing friction reduction with increasing surfactant concentration.

Figure 2:
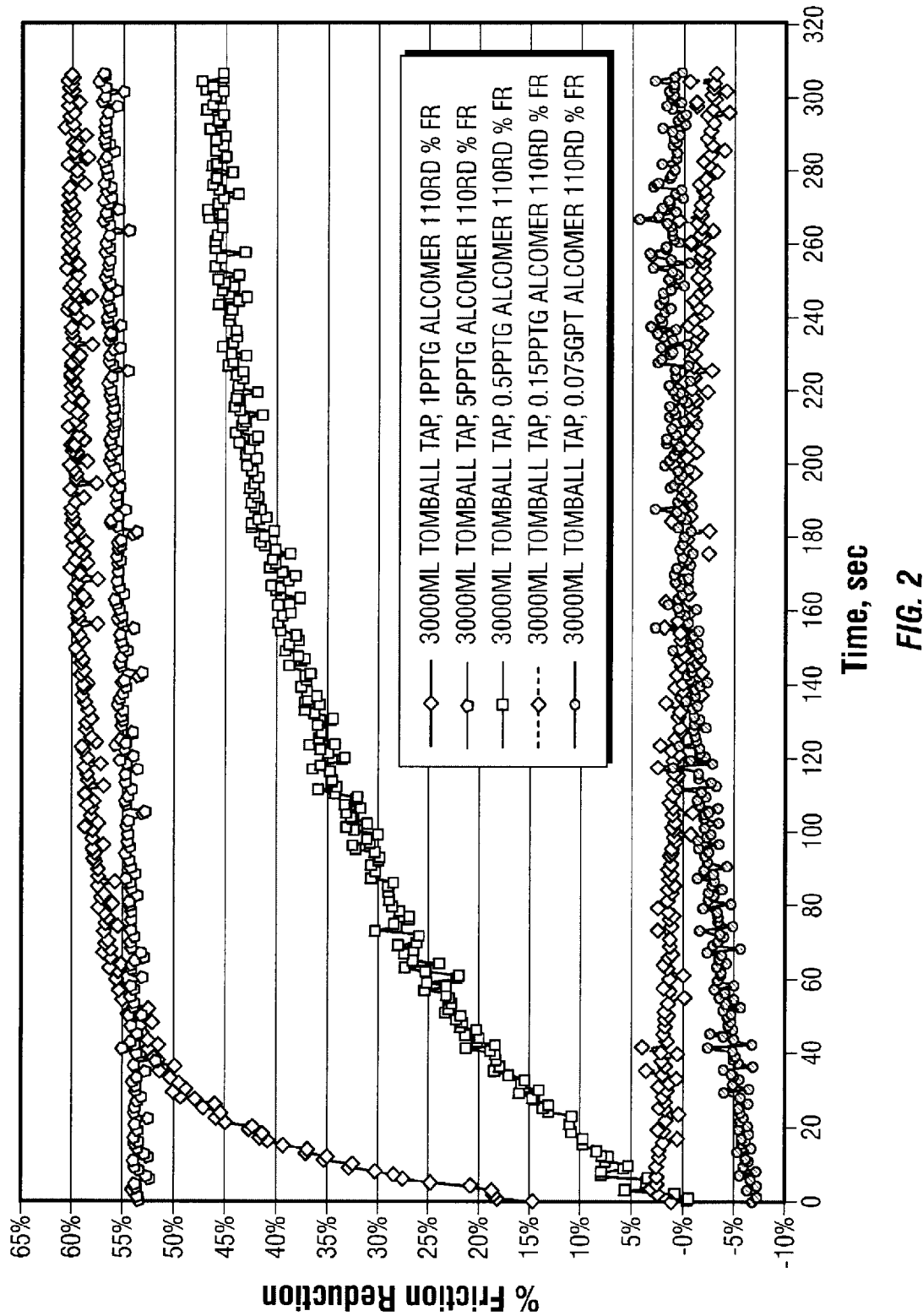

FIG. 2 shows the percent friction reduction for ALCOMER® 110RD at different concentrations in fresh water. Results show faster and increasing friction reduction with increasing polymer concentration. The 0.075 and 0.15 pptg ALCOMER® 110RD concentrations show no friction reduction.

Figure 3:
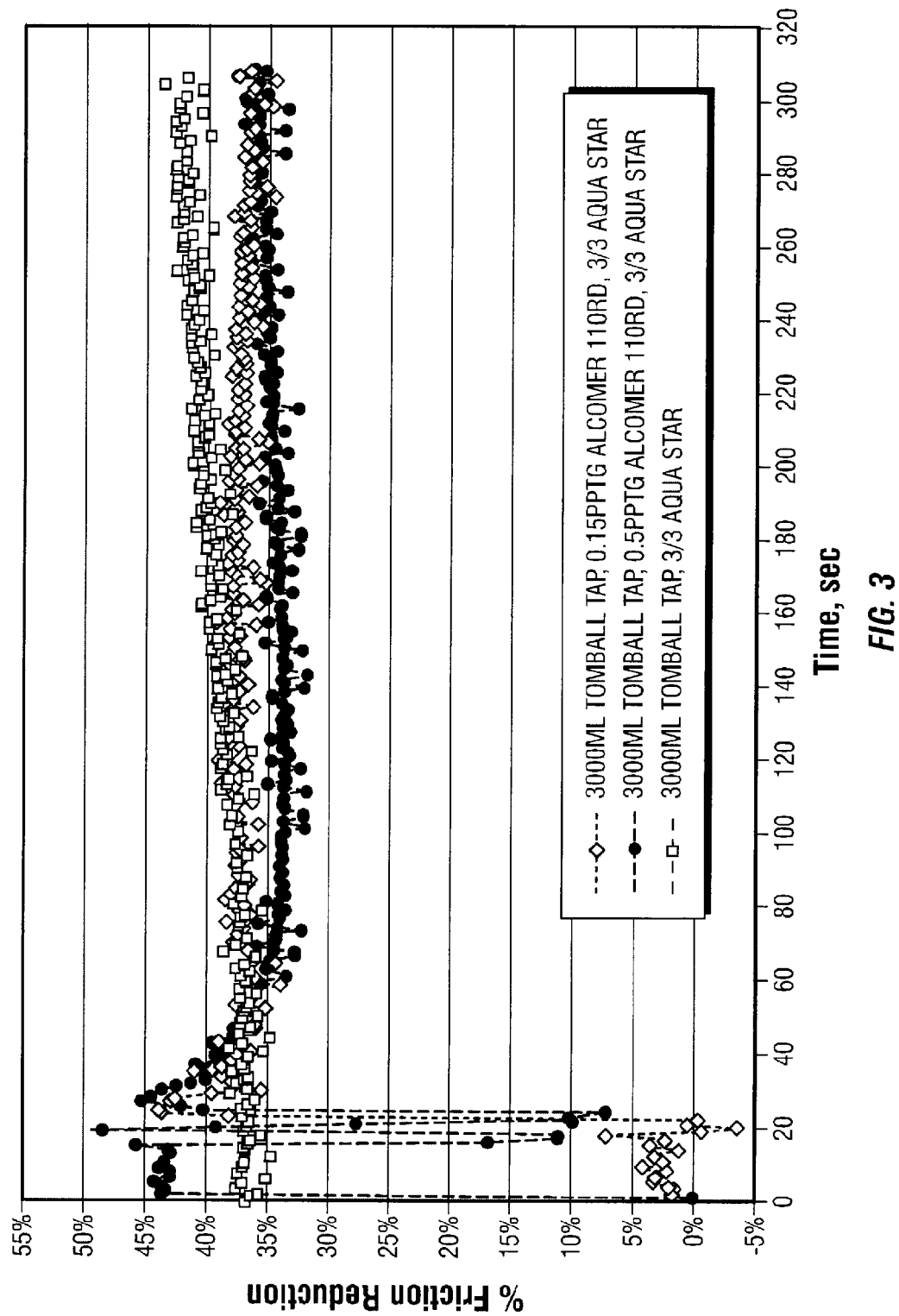

FIG. 3 shows the percent friction reduction for ALCOMER® 110RD in a 3/3 AQUA STAR™ fluid system. Results show that the addition of 0.15 and 0.5 pptg ALCOMER® 110RD to a 3/3 AQUA STAR™ fluid provided no additional friction reduction.

Figure 4:
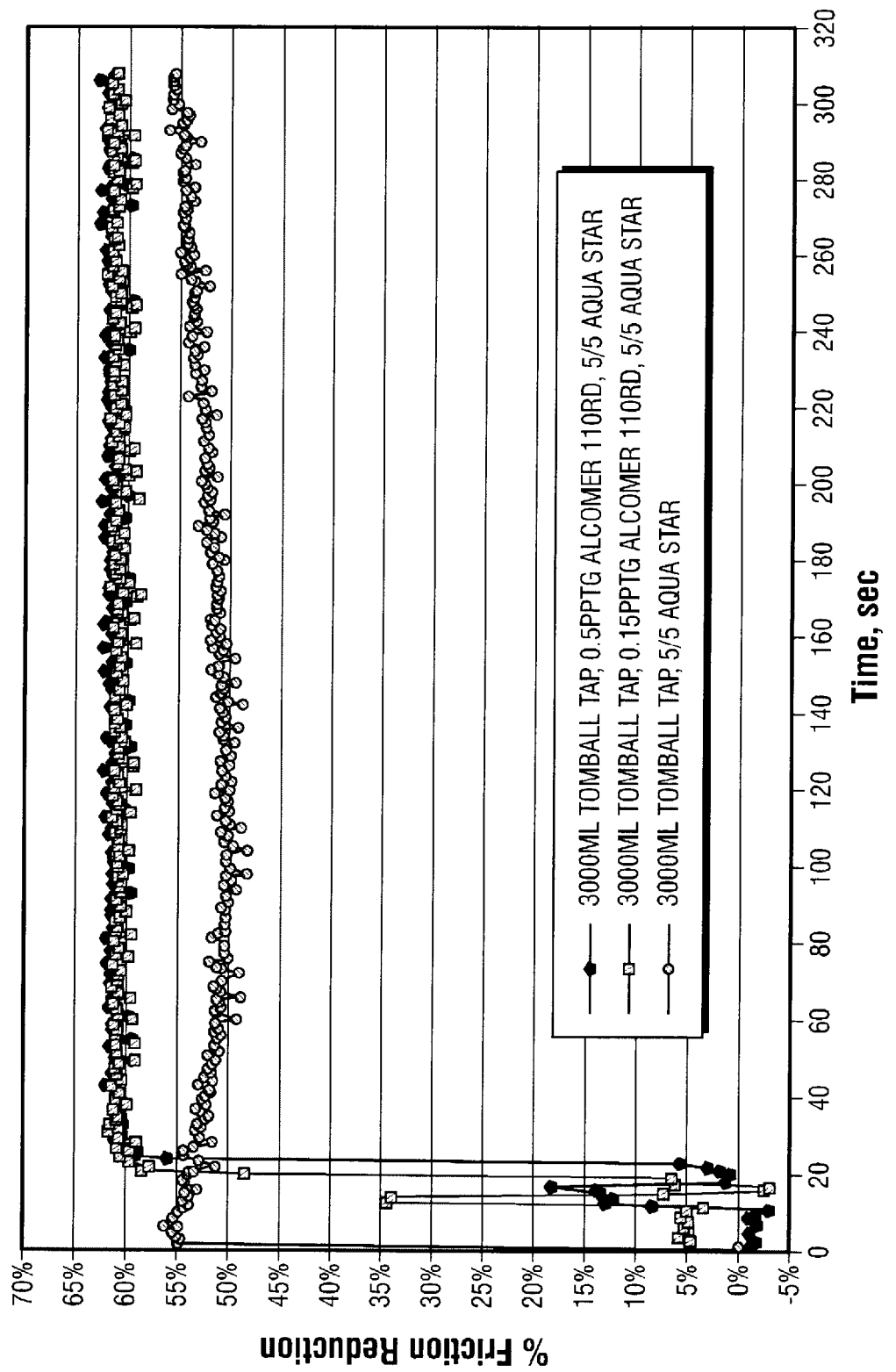

FIG. 4 shows the percent friction reduction for ALCOMER® 110RD in a 5/5 AQUA STAR™ fluid system. Results show that the addition of 0.15 and 0.5 pptg ALCOMER® 110RD to a 5/5 AQUA STAR™ fluid provided additional friction reduction.

Figure 5:
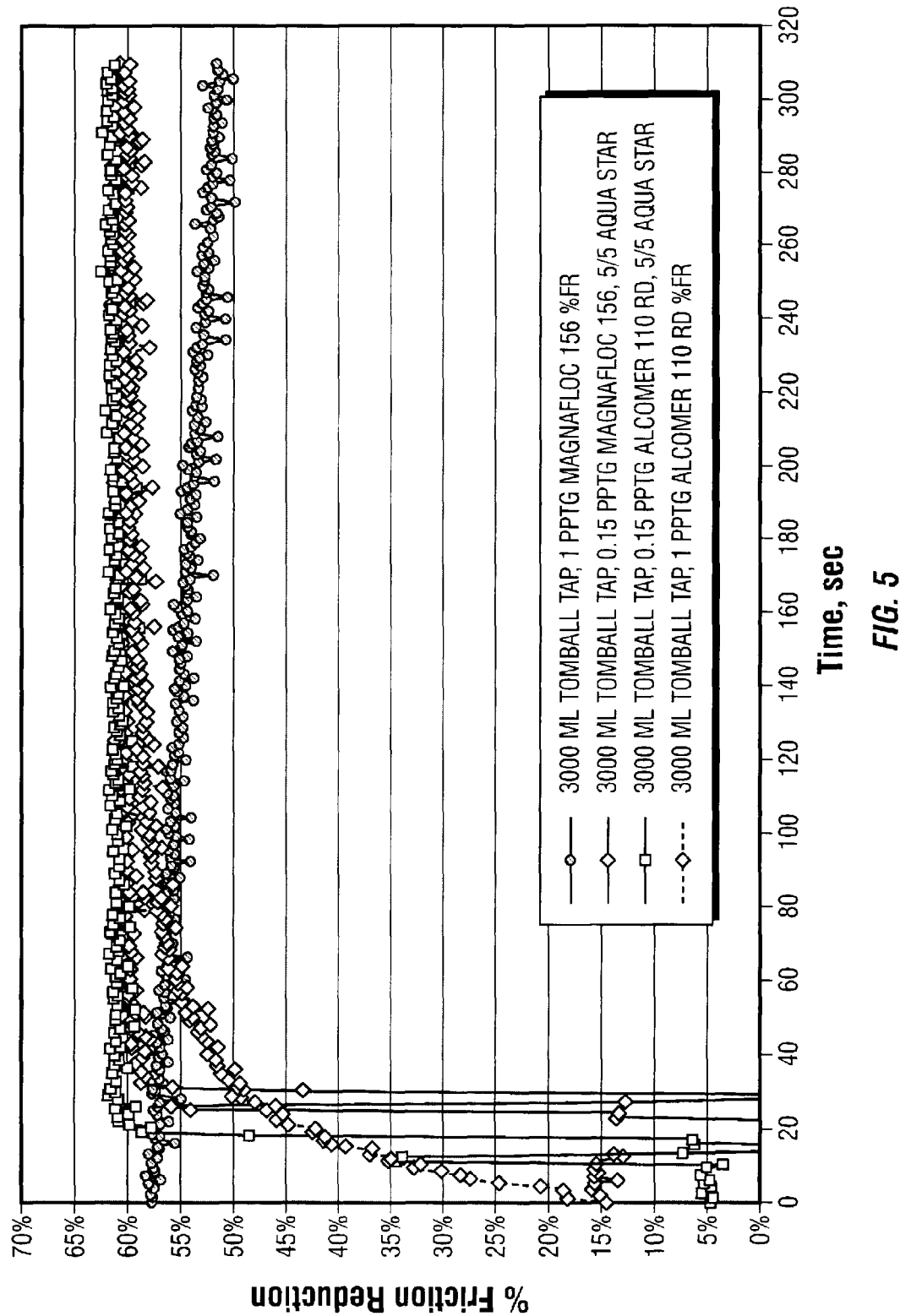

FIG. 5 shows the percent friction reduction of ALCOMER® 110RD and MAGNAFLOC® 156 in 5/5 AQUA STAR™ Fluid Systems. Results show that the addition of 0.15 and 0.5 pptg ALCOMER® 110RD or MAGNAFLOC® 156 to a 5/5 AQUA STAR™ fluid provided additional friction reduction.

Figure 6:
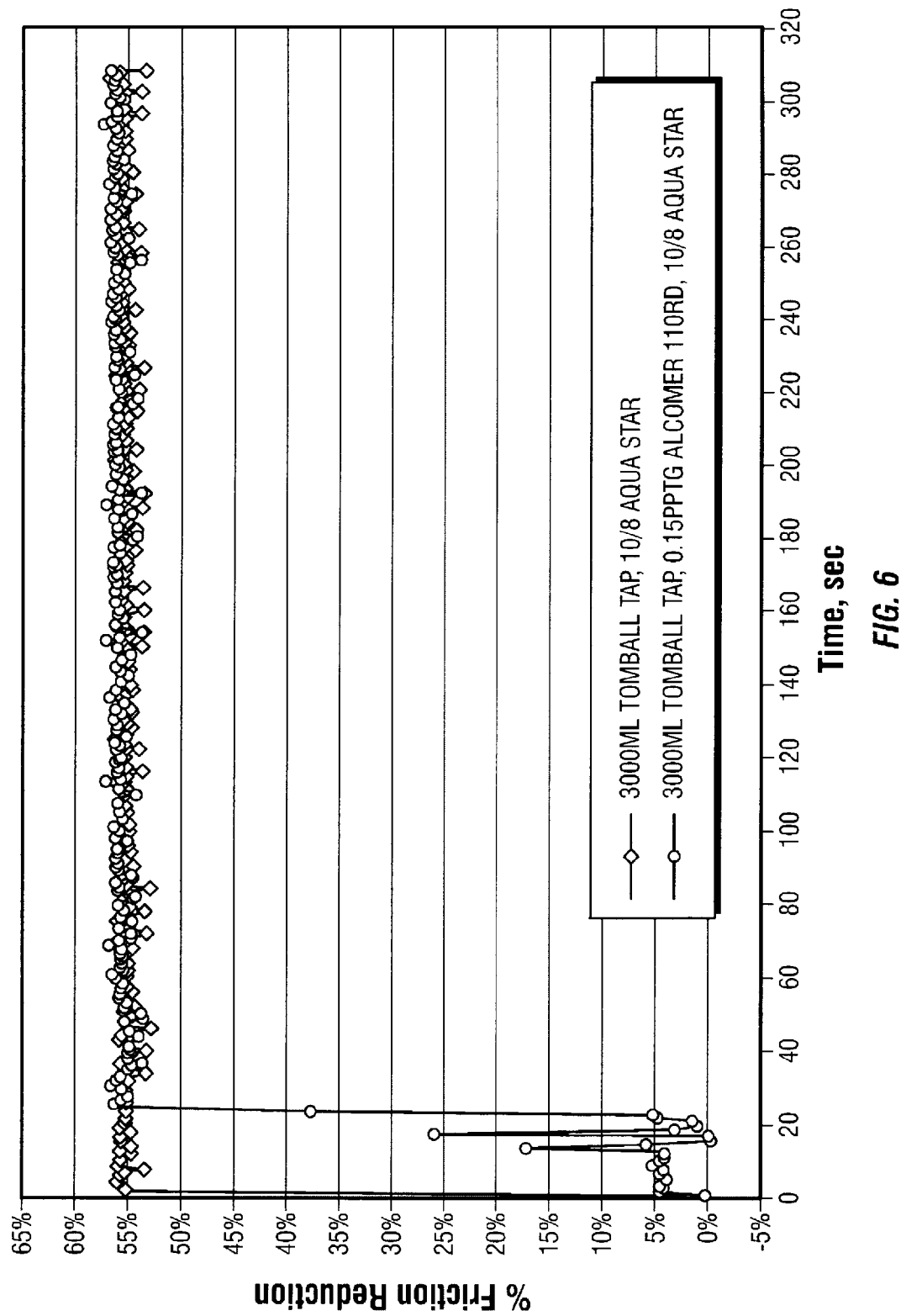

FIG. 6 shows the percent friction reduction of ALCOMER® 110RD in a 10/8 AQUA STAR™ fluid system. Results show that the addition of 0.15 pptg ALCOMER® 110RD to a 10/8 AQUA STAR™ fluid provided no additional friction reduction.

Figure 7:
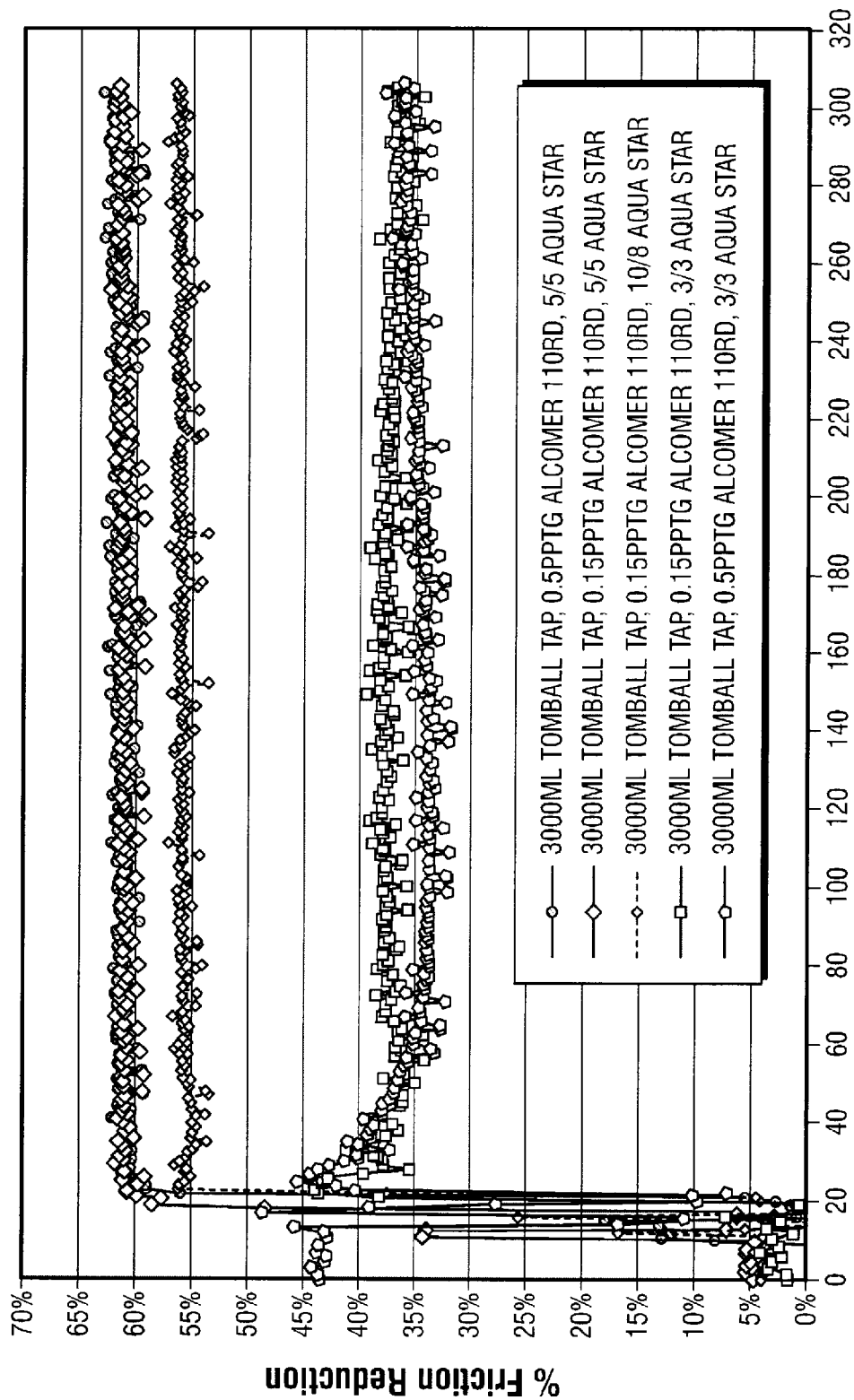

FIG. 7 shows the percent friction reduction of ALCOMER® 110RD in AQUA STAR™ fluid systems at different concentrations.

FIGS. 8-14 show the flow step rate friction reduction of the fluids. In these step rate tests, the differential pressure was measured across the small-scale friction loop at rates of 1.6 gpm, 1.9 gpm, 2.2 gpm, 2.5 gpm, 2.7 gpm and 2.9 gpm.

Figure 8:
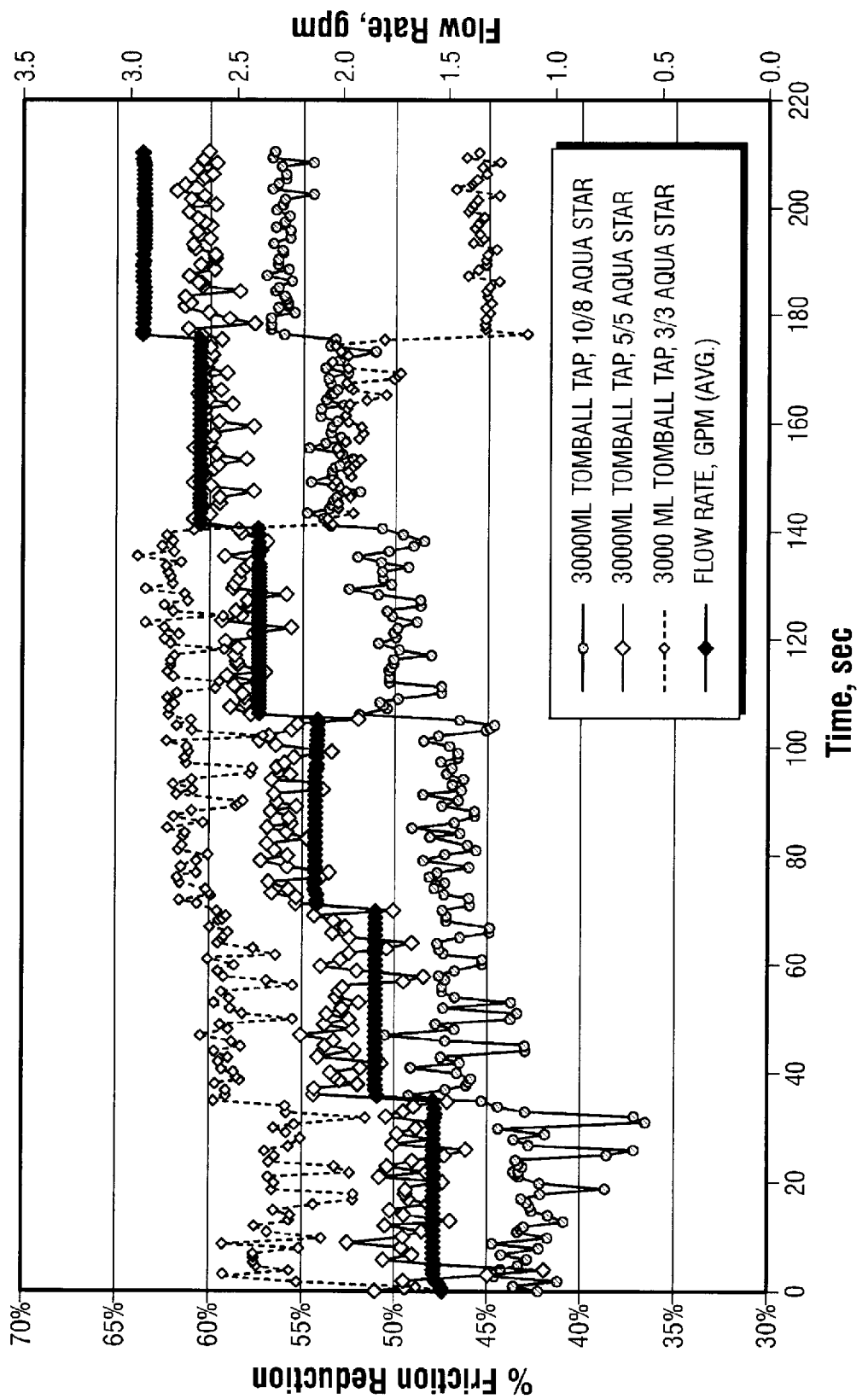

FIG. 8 shows the percent friction reduction of AQUA STAR™ fluid systems at increasing flow rates. Results indicate that the 3/3 AQUA STAR™ fluid friction reduction decreases at the higher flow rates. This may be due to shear degradation of the viscoelastic fluid.

Figure 9:
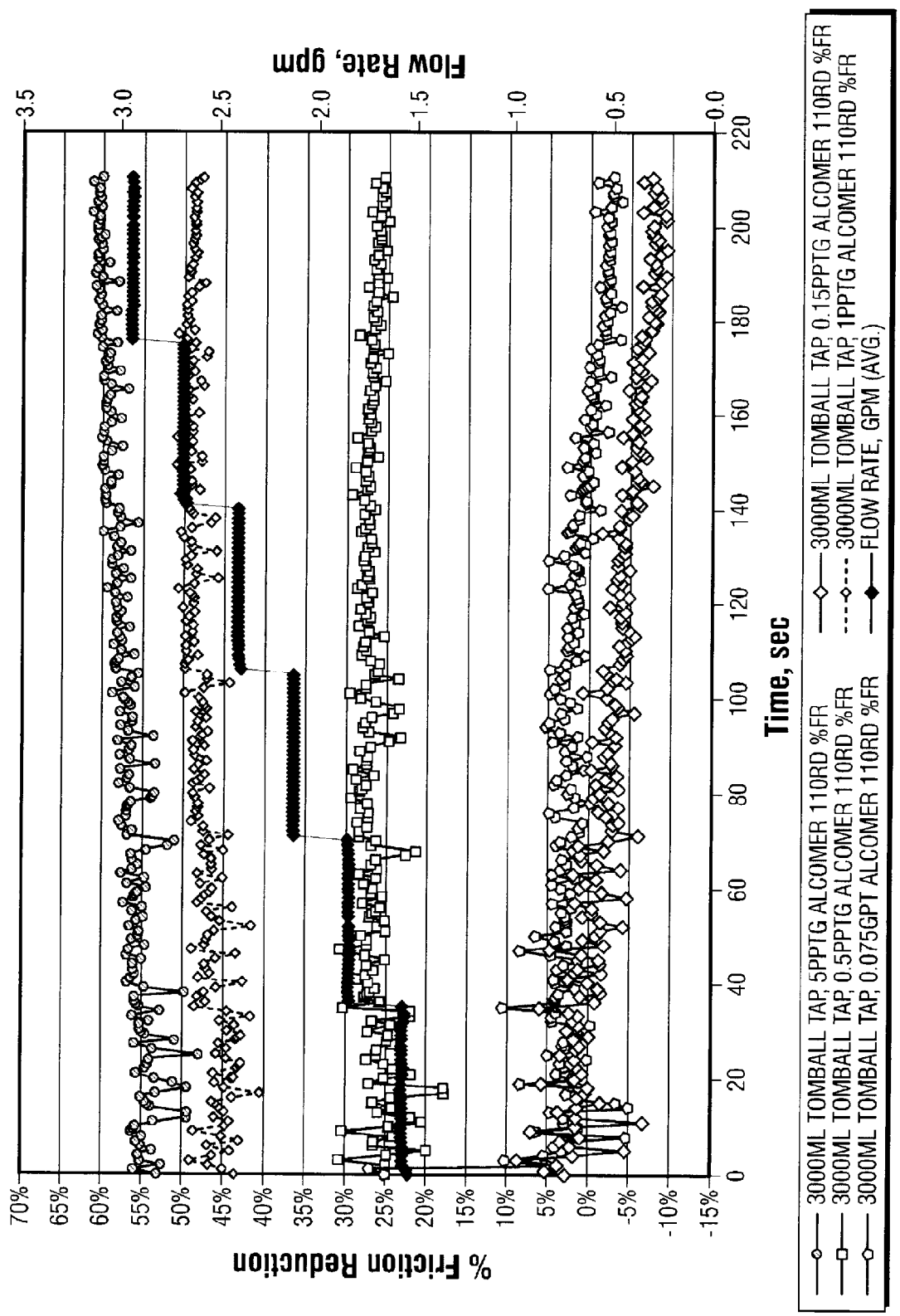

FIG. 9 shows the percent friction reduction of ALCOMER® 110RD in fresh water at increasing flow rates. Results show increasing friction reduction with increasing polymer concentration. The 0.075 and 0.15 pptg ALCOMER® 110RD concentrations show no friction reduction.

Figure 10:
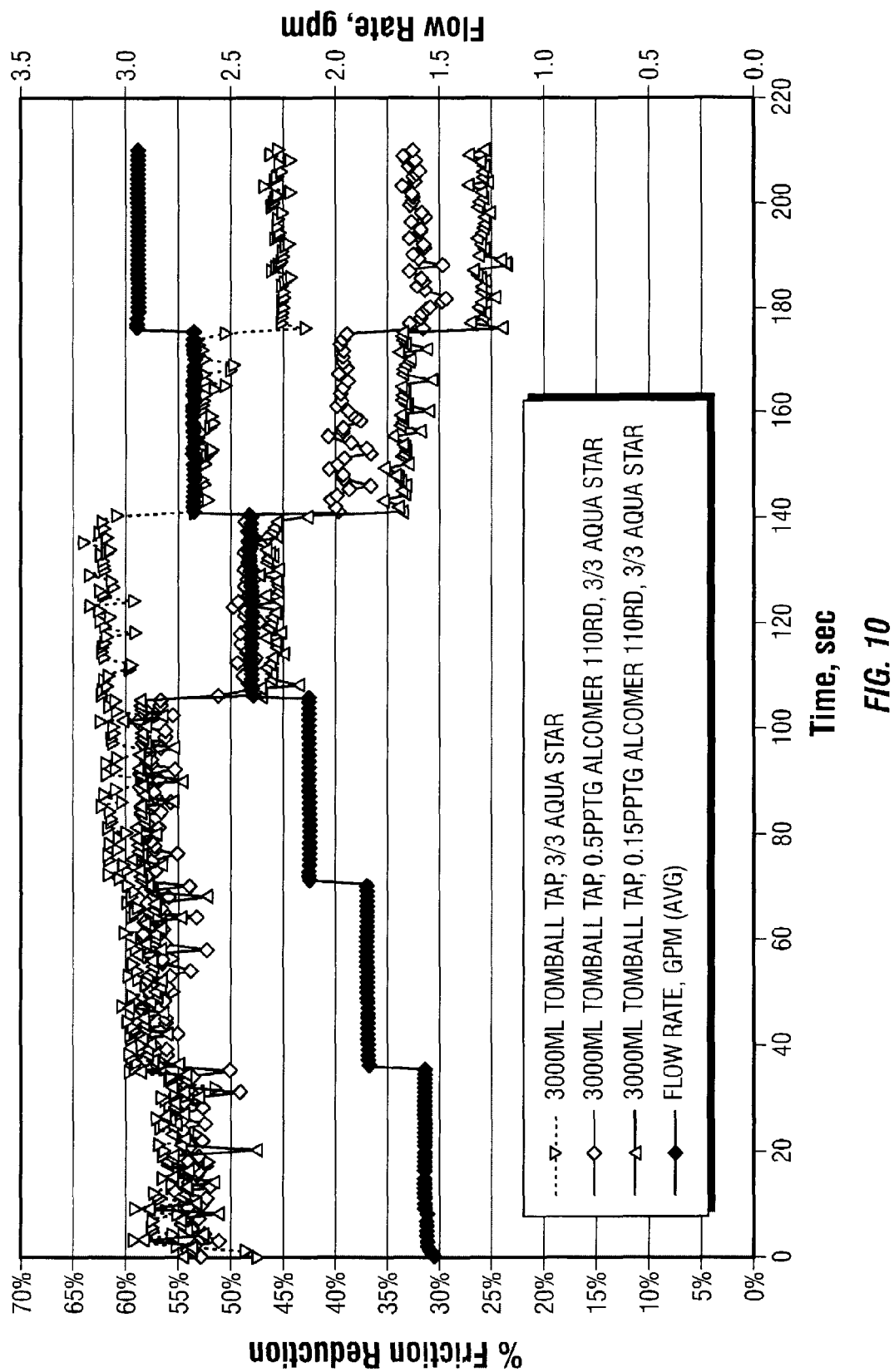

FIG. 10 shows the percent friction reduction of ALCOMER® 110RD in the 3/3 AQUA STAR™ fluid system at increasing flow rates. Results indicate that the addition of ALCOMER® 110RD to the 3/3 AQUA STAR™ fluid decreased the friction reduction of the 3/3 AQUA STAR™ fluid system at the higher flow rates.

Figure 11:
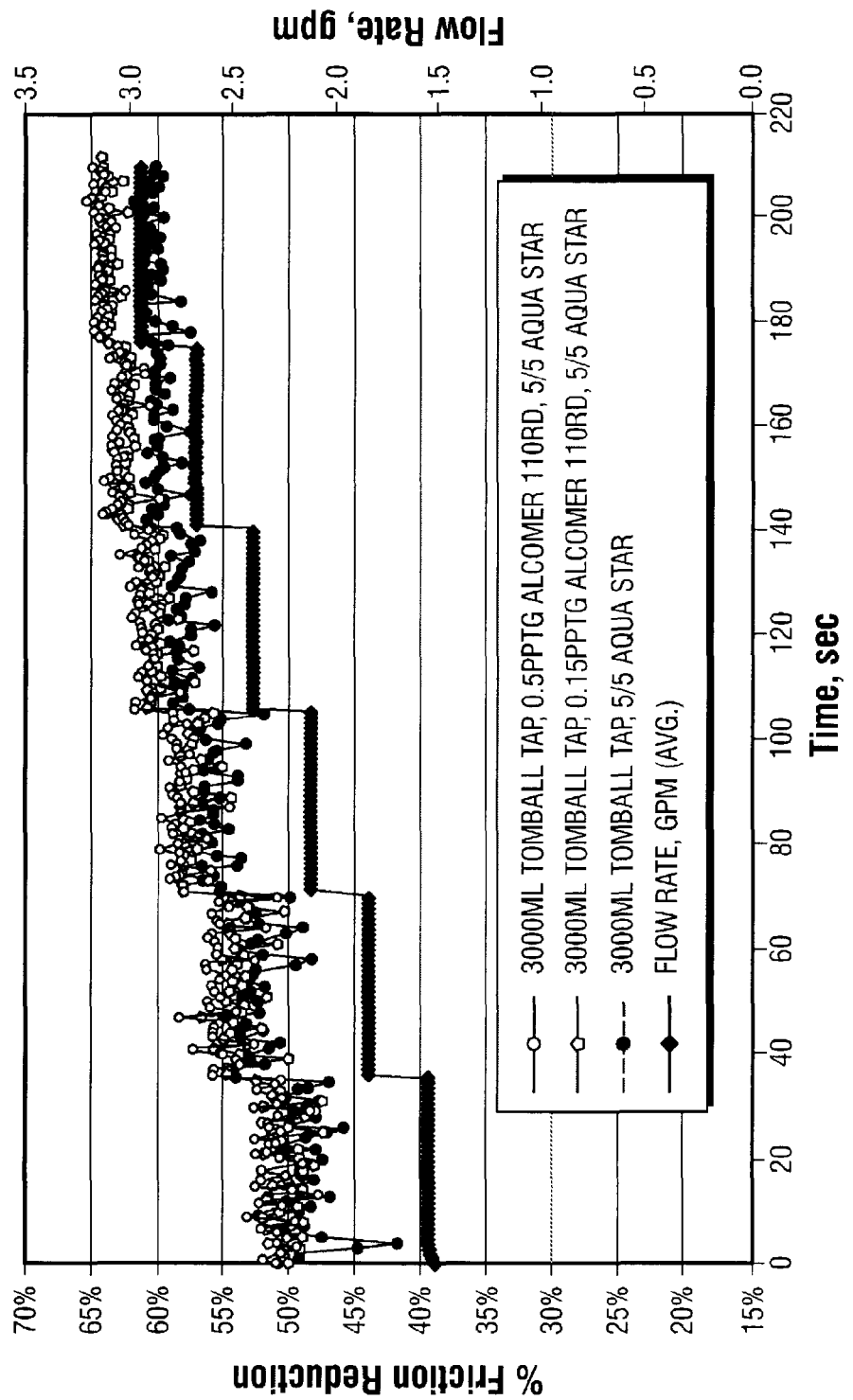

FIG. 11 shows the percent friction reduction of ALCOMER® 110RD in a 5/5 AQUA STAR™ fluid at increasing flow rates. Results indicate that the addition of ALCOMER® 110RD to the 5/5 AQUA STAR™ fluid increased the friction reduction of the 5/5 AQUA STAR™ fluid at the higher flow rates.

Figure 12:
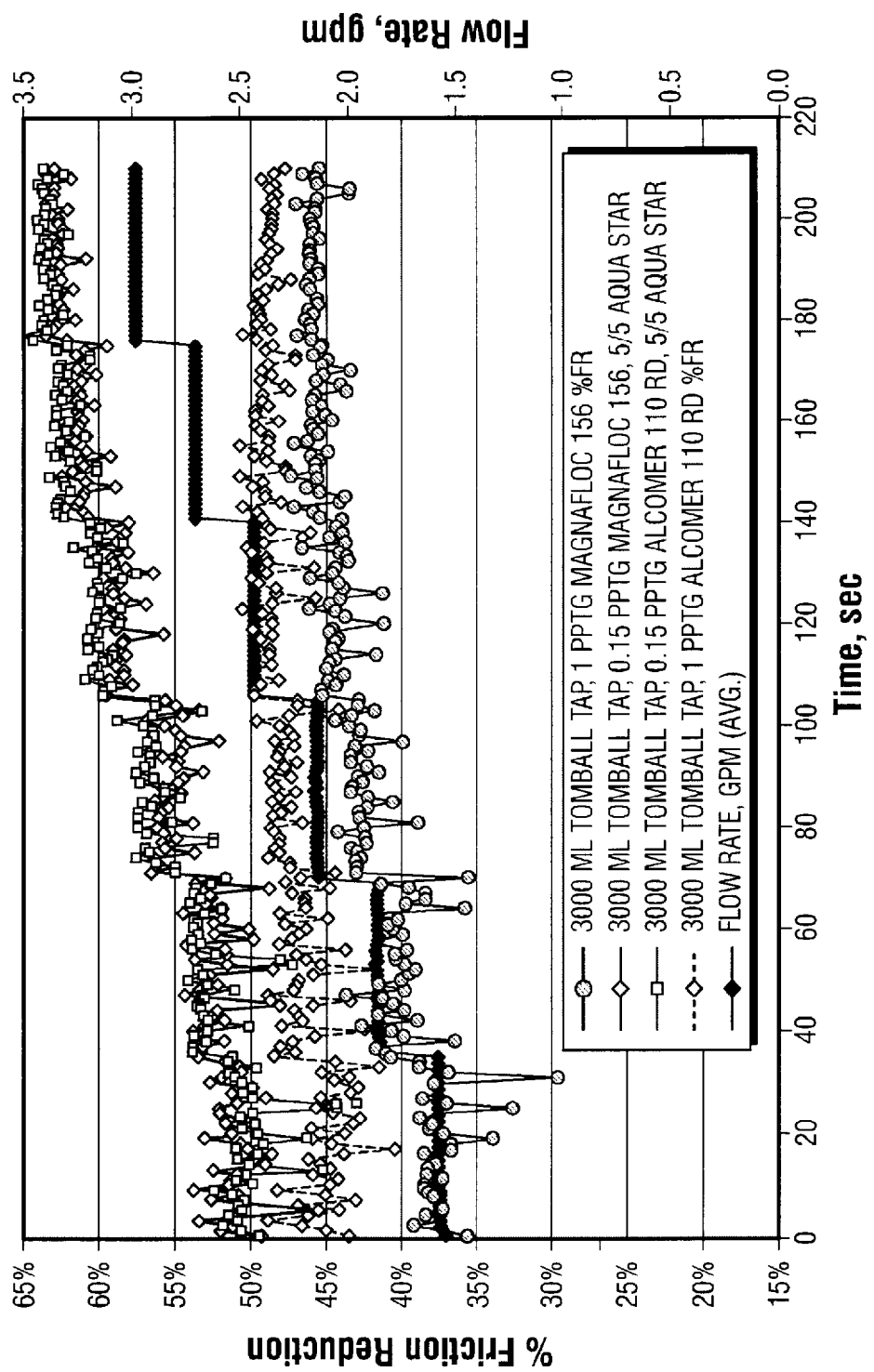

FIG. 12 shows the percent friction reduction of ALCOMER® 110RD and MAGNAFLOC® 156 in 5/5 AQUA STAR™ fluid systems at increasing flow rates. Results indicate that the addition of ALCOMER® 110RD and MAGNAFLOC® 156 to the 5/5 AQUA STAR™ fluid increased the friction reduction of the 5/5 AQUA STAR™ fluid at the higher flow rates.

Figure 13:
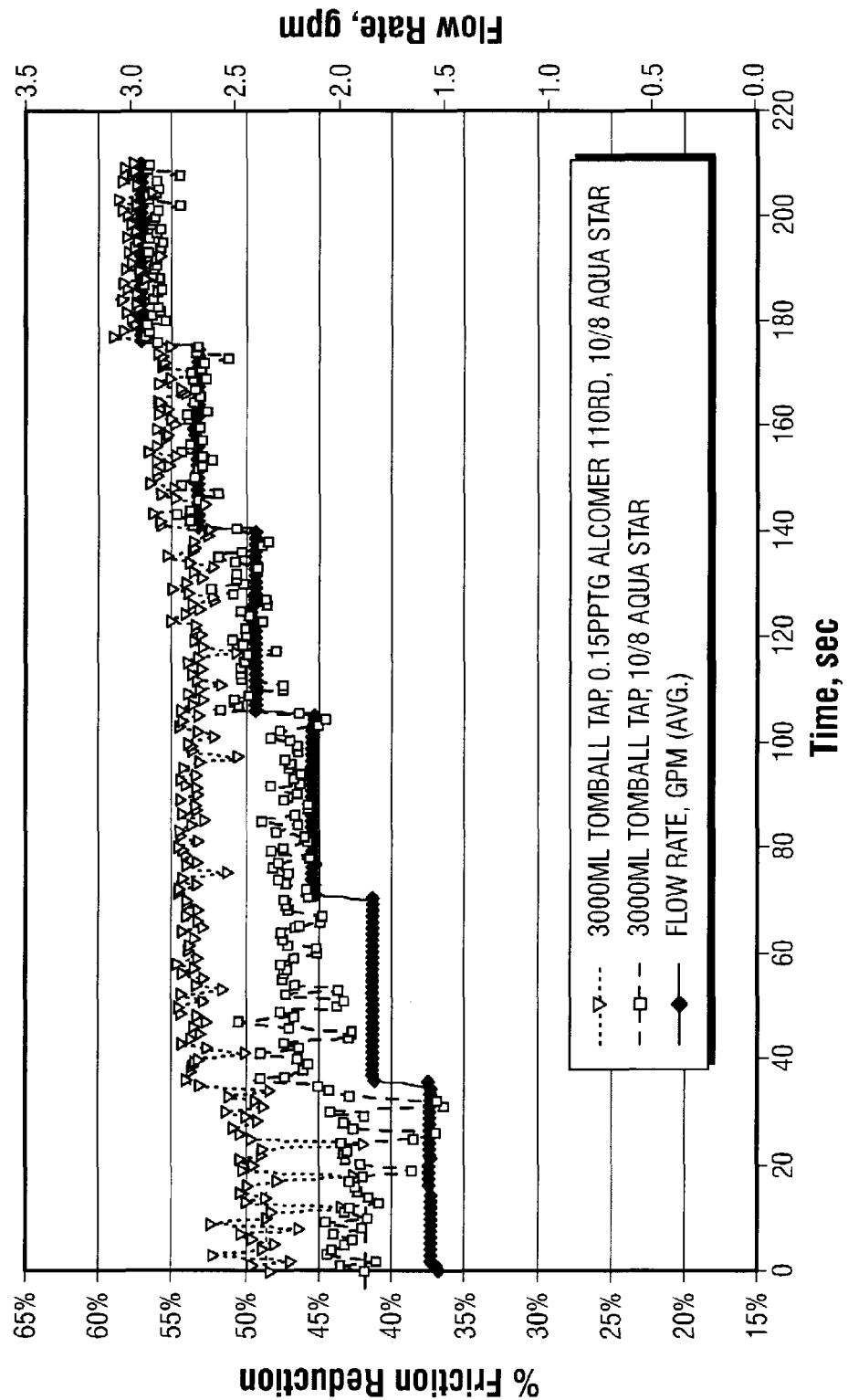

FIG. 13 shows the percent of friction reduction of ALCOMER® 110RD in a 10/8 AQUA STAR™ fluid system at increasing flow rates. Results indicate that the addition of ALCOMER® 110RD to the 10/8 AQUA STAR™ fluid increased the friction reduction of the 10/8 AQUA STAR™ fluid at the lower flow rates.

Figure 14:
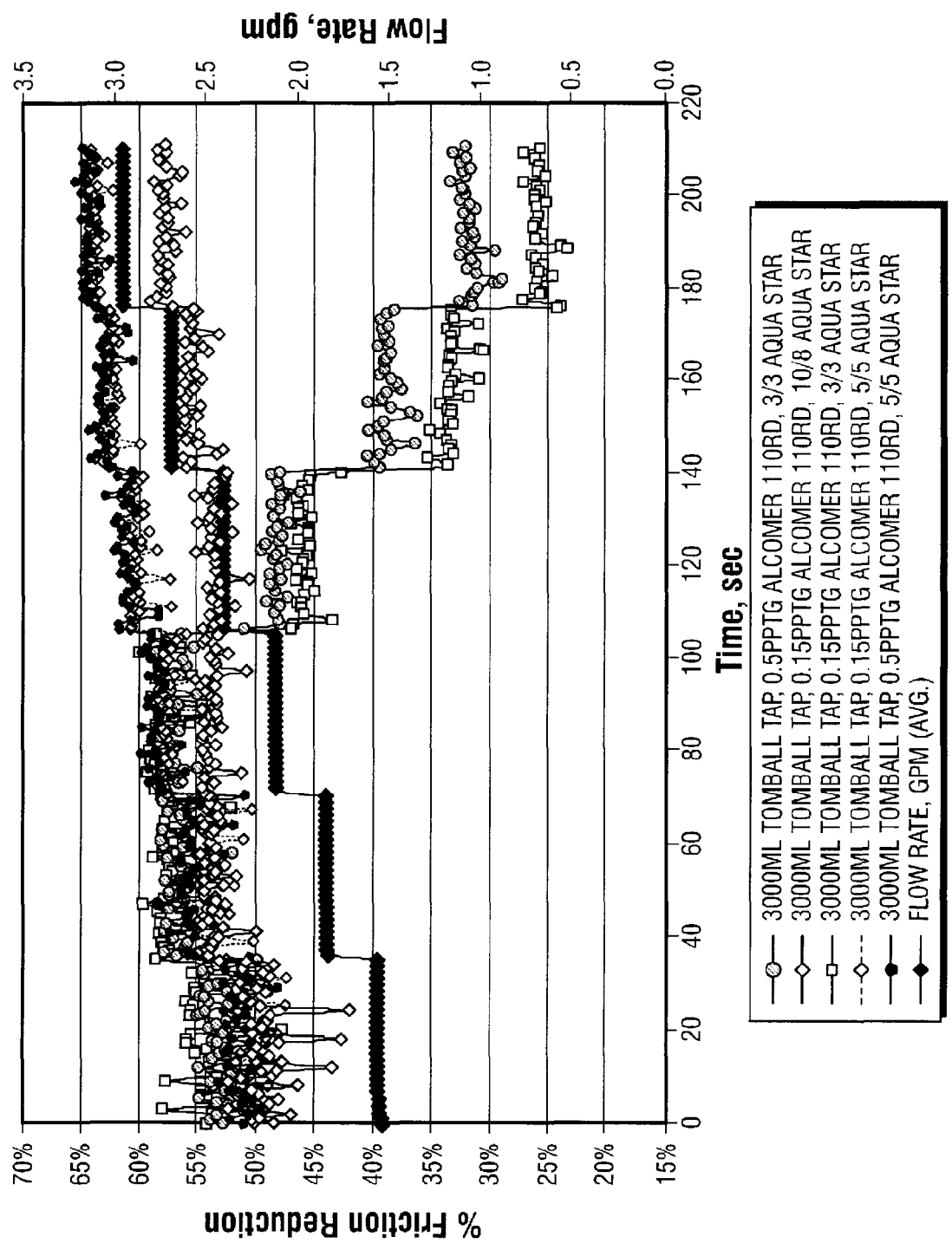

FIG. 14 shows the percent friction reduction of ALCOMER® 110RD in the AQUA STAR™ fluid systems at increasing flow rates.

The results of the testing described above generally shows that adding either of the friction reducers, ALCOMER® 110RD or MAGNAFLOC® 156, to the AQUA STAR™ fluid can provide good friction reduction. In particular, the addition of the ALCOMER® 110RD or MAGNAFLOC® 156 reduces friction at high flow rates compared with the AQUA STAR™ formulations without the friction reducers. For example, the addition of 0.15 pptg and 0.5 pptg ALCOMER® 110RD to a 5/5 AQUA STAR™ fluid system is very effective in reducing the friction pressure in early time friction reduction tests. The addition of 0.15 pptg MAGNAFLOC® 156 to a 5/5 AQUA STAR™ fluid system is also very effective in reducing the friction pressure in early time friction reduction tests.

Results also show that the addition of either 0.15 pptg or 0.5 pptg ALCOMER® 110RD to 3/3 AQUA STAR™ and 10/8 AQUA STAR™ fluids provided little or no additional friction reduction in early time friction reduction tests. Results of friction tests, at increasing flow rates, indicate that the 3/3 AQUA STAR™ fluid friction reduction decreases at the higher flow rates. This may be due to shear degradation of the viscoelastic fluid.

Results of friction tests at increasing flow rates indicate that the addition of 0.15 and 0.5 pptg ALCOMER® 110RD to the 3/3 AQUA STAR™ fluid decreased the friction reduction of the 3/3 AQUA STAR™ Fluid System at the higher flow rates. Similarly, results of friction tests, at increasing flow rates, indicate that the addition of 0.15 and 0.5 pptg ALCOMER® 110RD and MAGNAFLOC® 156 to the 5/5 AQUA STAR™ fluid increased the friction reduction of the 5/5 AQUA STAR™ Fluid System at the higher flow rates. Results of friction tests at increasing flow rates also indicate that the addition of 0.15 pptg ALCOMER® 110RD to the 10/8 AQUA STAR™ fluid increased the friction reduction of the 10/8 AQUA STAR™ Fluid System at the lower flow rates.

Although various embodiments have been shown and described, the present disclosure is not so limited and will be understood to include all such modifications and variations as would be apparent to one skilled in the art.

What is claimed is:

1. A method of servicing a wellbore, the method comprising introducing into the wellbore a well servicing fluid comprising an aqueous based viscoelastic gel and a friction reducer dissolved in the aqueous based viscoelastic gel, the friction reducer having at least one polymer unit chosen from acrylamide groups, acrylate groups, sulfo groups, and maleic acid groups; and the aqueous based gel comprising an anionic surfactant and a cationic surfactant and wherein the concentration of friction reducer is about 0.5 pounds per thousand gallons or less, based on the total well servicing fluid.

2. The method of claim 1, wherein the well servicing fluid is a completion fluid.

3. The method of claim 1, wherein the well servicing fluid is either a fluid loss pill or a loss circulation pill.

4. The method claim 1, wherein the well servicing fluid is a gravel pack fluid.

5. The method of claim 1, wherein the friction reducer is a copolymer of sodium acrylate and acrylamide.

6. The method of claim 1, wherein the friction reducer is a dry powder.

7. The method of claim 1, wherein the friction reducer is anionic.

8. The method of claim 1, wherein the friction reducer is cationic.

9. The method of claim 1, wherein the friction reducer is nonionic.

10. The method of claim 1, wherein the aqueous base is a liquid chosen from fresh water, brine, and produced water.

11. The method of claim 1, wherein the fluid is formulated with at least one breaker.

12. The method of claim 1, wherein the fluid is formulated with at least one additional compound chosen from water wetting surfactants, non-emulsifiers, additional viscosifying agents, additional surfactants, clay stabilization additives, scale dissolvers, biopolymer degradation additives, fluid loss control additives and high temperature stabilizers.

13. The method of claim 1, wherein the fluid does not comprise mineral oil.

14. A method of fracturing a subterranean formation penetrated by a wellbore, the method comprising:
introducing into the wellbore at a pressure sufficient to initiate a fracture a well servicing fluid comprising an aqueous based gel and a friction reducer dissolved in the aqueous based gel, the friction reducer having at least one polymer unit chosen from acrylamide groups, acrylate groups, sulfo groups, and maleic acid groups; and the aqueous based gel comprising an anionic surfactant and a cationic surfactant, wherein the concentration of friction reducer is about 0.5 pounds per thousand gallons or less, based on the total well servicing fluid.

15. The method of claim 14, wherein the fluid further comprises a proppant selected from the group consisting of sand, glass, ceramic, bauxite, walnut shell fragments, aluminum pellets and nylon pellets and combination thereof.

16. The method of claim 14, wherein the friction reducer is a copolymer of sodium acrylate and acrylamide.

17. The method of claim 14, wherein the aqueous base is a liquid chosen from fresh water, brine, and produced water.

18. A method of reducing the friction of a viscoelastic gel during the pumping of the viscoelastic gel through pumping equipment and/or well tubulars within a wellbore, the method comprising introducing into the pumping equipment or wellbore a well servicing fluid comprising an aqueous based viscoelastic gel and a friction reducer dissolved in the aqueous based viscoelastic gel, the friction reducer having at least one polymer unit chosen from acrylamide groups, acrylate groups, sulfo groups, and maleic acid groups; and the aqueous based viscoelastic gel comprising an anionic surfactant and a cationic surfactant and wherein the concentration of friction reducer is about 0.5 pounds per thousand gallons or less, based on the total well servicing fluid.

19. The method of claim 18, wherein the amount of friction reducer dissolved in the aqueous based viscoelastic gel is between from about 0.05 to about 0.25 pounds per thousand gallons (pptg).

20. The method of claim 18, wherein the friction reducer is a copolymer of sodium acrylate and acrylamide.

* * * * *